United States Patent
Schneider et al.

(10) Patent No.: US 8,820,503 B2
(45) Date of Patent: Sep. 2, 2014

(54) ISOLATOR DECOUPLER

(75) Inventors: Dean Schneider, Washington, MI (US);
Alexander Serkh, Troy, MI (US); Peter Ward, Farmington Hills, MI (US)

(73) Assignee: The Gates Corporation, Denver, CO (US)

( * ) Notice: Subject to any disclaimer, the term of this patent is extended or adjusted under 35 U.S.C. 154(b) by 220 days.

(21) Appl. No.: 13/541,216

(22) Filed: Jul. 3, 2012

(65) Prior Publication Data

US 2014/0008175 A1 Jan. 9, 2014

(51) Int. Cl.
*F16H 55/36* (2006.01)
*F16D 41/20* (2006.01)
*F16D 7/02* (2006.01)

(52) U.S. Cl.
USPC ............. 192/55.5; 192/41 S; 474/94; 464/40

(58) Field of Classification Search
CPC ....................................................... F16D 41/20
USPC ................ 192/55.1, 55.5; 474/74, 94; 464/40
See application file for complete search history.

(56) References Cited

U.S. PATENT DOCUMENTS

| | | | |
|---|---|---|---|
| 5,139,463 A | 8/1992 | Bytzek et al. | |
| 6,044,943 A | 4/2000 | Bytzek et al. | |
| 6,083,130 A | 7/2000 | Mevissen et al. | |
| 7,070,033 B2 * | 7/2006 | Jansen et al. | 192/41 S |
| 7,153,227 B2 | 12/2006 | Dell et al. | |
| 7,207,910 B2 | 4/2007 | Dell et al. | |
| 7,712,592 B2 * | 5/2010 | Jansen et al. | 192/41 S |
| 7,766,774 B2 * | 8/2010 | Antchak et al. | 474/74 |
| 8,678,157 B2 * | 3/2014 | Ward et al. | 192/55.1 |
| 2010/0116617 A1 | 5/2010 | Serkh et al. | |
| 2011/0065537 A1 | 3/2011 | Serkh et al. | |
| 2011/0245000 A1 | 10/2011 | Serkh | |

FOREIGN PATENT DOCUMENTS

| | | |
|---|---|---|
| WO | 2012061930 A1 | 5/2012 |
| WO | 2012061936 A1 | 5/2012 |

OTHER PUBLICATIONS

Peter Ward et al; "Isolator Decoupler"; U.S. Appl. No. 13/115,204, filed May 25, 2011; USPTO.
Xiaohua Chen et al; "Isolator Decoupler"; U.S. Appl. No. 13/487,755, filed Jun. 4, 2012; USPTO.
European Patent Office, Notification of Transmittal of The International Search Report and the Written Opinion of the International Searching Authority, or the Declaration, mailing date Jul. 9, 2013.

* cited by examiner

*Primary Examiner* — Richard M. Lorence
(74) *Attorney, Agent, or Firm* — Jeffrey A. Thurnau, Esq.; Paul N. Dunlap, Esq.

(57) ABSTRACT

An isolator decoupler comprising a pulley, a shaft, the pulley journalled to the shaft on a low friction bushing, a spring carrier disposed within the pulley, a torsion spring coupled between the pulley and the spring carrier, a wrap spring one way clutch wrapped about the shaft and having a frictional engagement therewith, the wrap spring one way clutch coupled to the spring carrier, the wrap spring one way clutch is disposed radially inward of the torsion spring, and the pulley temporarily engagable with an end of the wrap spring one way clutch in an unwinding direction whereby a temporary contact between the wrap spring one way clutch end and the pulley will temporarily diminish the frictional engagement of the wrap spring one way clutch with the shaft.

7 Claims, 5 Drawing Sheets

ISOLATOR DECOUPLER

FIELD OF THE INVENTION

The invention relates to an isolator decoupler having a pulley temporarily engagable with an end of the wrap spring one way clutch in an unwinding direction whereby a temporary contact between the wrap spring one way clutch end and the pulley will temporarily diminish the frictional engagement of the wrap spring one way clutch from the shaft.

BACKGROUND OF THE INVENTION

This invention relates to alternator tuning devices, particularly to alternator isolating decoupler (AID) pulleys with torsion springs for isolation. The function and utility of alternator tuning devices is commonly known. Today's commercially available AID devices have an isolating spring, one way clutch, bearing(s), a pulley and certain other components. The need for each of these components typically requires the overall size diameter of the device to exceed what the industry desires. With todays ever smaller automotive engine sizes and ever increasing fuel efficiency requirements, there is a need for AID devices that have a reduced pulley diameter while meeting the required functionality.

Representative of the art is U.S. Pat. No. 7,153,227 which discloses a decoupler for an alternator pulley in a serpentine drive system has a resilient, helical spring member that couples the alternator pulley with a hub structure through a spring retaining member. A bushing is disposed between the spring retaining member and the hub structure to facilitate sliding engagement therebetween. An annular sleeve member is disposed between the spring member and the alternator pulley to facilitate sliding engagement therebetween. The spring member is connected at one end thereof to the hub structure and connected at an opposite end thereof to the spring retaining member. The resilient spring member transmits the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement.

What is needed is an isolator decoupler having a pulley temporarily engagable with an end of the wrap spring one way clutch in an unwinding direction whereby a temporary contact between the wrap spring one way clutch end and the pulley will temporarily diminish the frictional engagement of the wrap spring one way clutch from the shaft. The present invention meets this need.

SUMMARY OF THE INVENTION

The primary aspect of the invention is an isolator decoupler having a pulley temporarily engagable with an end of the wrap spring one way clutch in an unwinding direction whereby a temporary contact between the wrap spring one way clutch end and the pulley will temporarily diminish the frictional engagement of the wrap spring one way clutch from the shaft.

Other aspects of the invention will be pointed out or made obvious by the following description of the invention and the accompanying drawings.

The invention comprises an isolator decoupler comprising a pulley, a shaft, the pulley journalled to the shaft on a low friction bushing, a spring carrier disposed within the pulley, a torsion spring coupled between the pulley and the spring carrier, a wrap spring one way clutch wrapped about the shaft and having a frictional engagement therewith, the wrap spring one way clutch coupled to the spring carrier, the wrap spring one way clutch is disposed radially inward of the torsion spring, and the pulley temporarily engagable with an end of the wrap spring one way clutch in an unwinding direction whereby a temporary contact between the wrap spring one way clutch end and the pulley will temporarily diminish the frictional engagement of the wrap spring one way clutch with the shaft.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
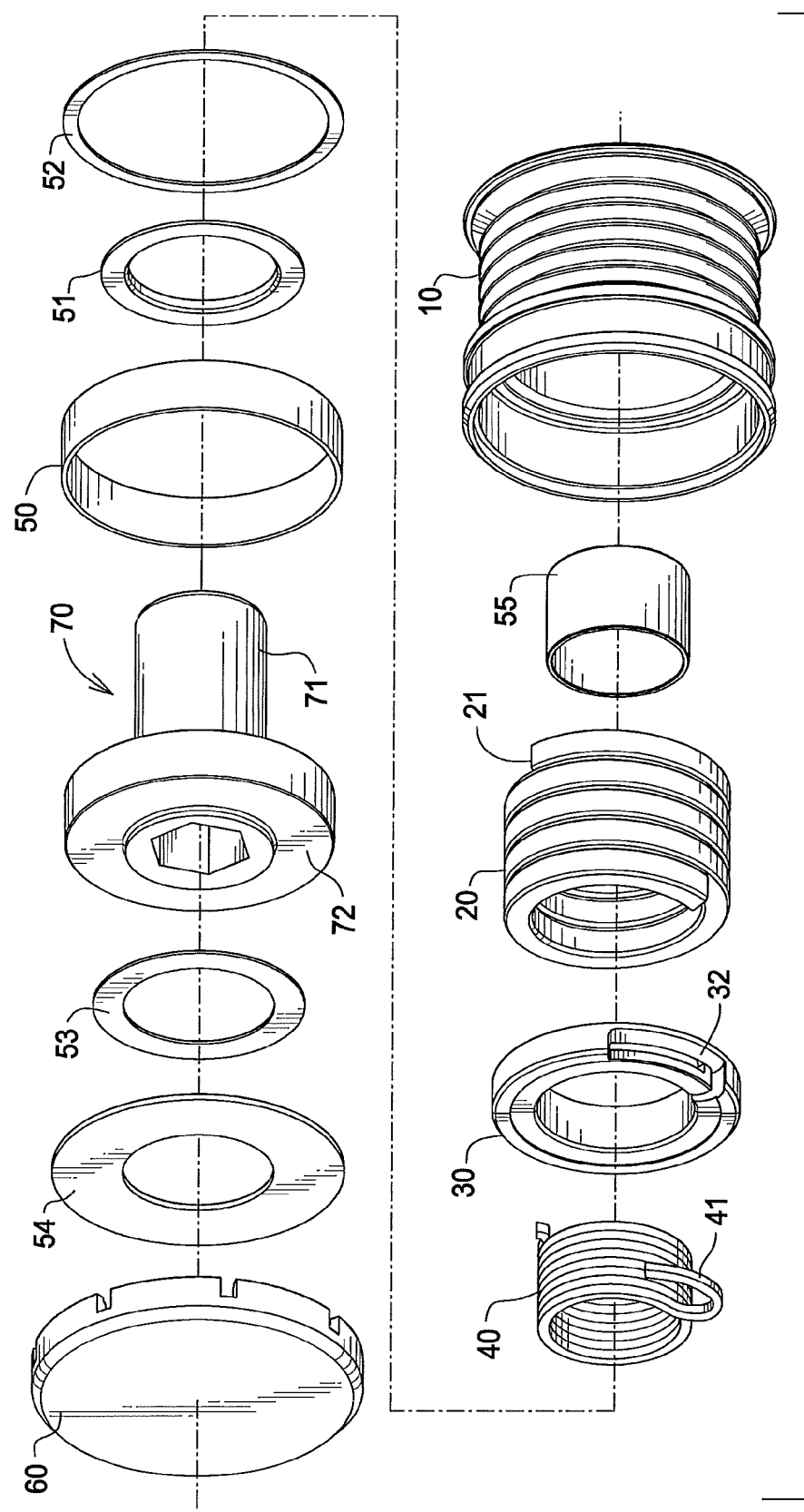
FIG. 1 is an exploded view of the device.

FIG. 1 is an exploded view of the device. The invention comprises a pulley 10, a isolating torsion spring 20, a spring carrier 30, a wrap spring one-way clutch 40, low friction bushings 50, 51, 52, 53, 55, a thrust washer 54, a dust cover 60, and a shaft 70.

In particular, pulley 10 is journalled to shaft 70 on bushings 50 and 55. Bushings are used instead of other types of bearings such as needle bearings or ball bearings because the bushings allow the device the have a smaller overall diameter. In this embodiment pulley 10 has a multi-ribbed profile for engaging a belt on a vehicle engine front end accessory drive (FEAD).

Wrap spring one way clutch 40 is a helically wound spring and is wrapped about an outer circumference surface 71 of shaft 70. The engagement between the wrap spring one way clutch 40 and the shaft surface 71 is frictional. An end 41 of wrap spring one way clutch 40 is coupled to the spring carrier receiving portion 32. Wrap spring one way clutch 40 is disposed radially inward of the torsion spring 20 between the torsion spring 20 and the shaft 70.

The isolating torsion spring 20 is coupled between the pulley 10 and the spring carrier 30. In operation torsion spring 20 is loaded in the unwinding direction by pulley 10. In an alternate embodiment, the torsion spring 20 is loaded in the winding direction. In this embodiment the torsion spring 20 has a rectangular cross section, see FIG. 2.

A dust cover 60 prevents debris from entering the device and fouling the bushings. A thrust washer 54 is press fit on an end of pulley 10. Bushing 53 is disposed between the shaft flange 72 and the thrust washer 54. A bushing 51 is disposed between spring carrier 30 and shaft flange 72. A bushing 52 is disposed between pulley 10 and shaft flange 72.

Torque transmission in the inventive device is from the pulley 10 to the isolator torsion spring 20 to the spring carrier 30 to the wrap-spring one-way clutch 40 to the shaft 70. In operation the wrap spring one way clutch is loaded in the winding direction. This allows the wrap spring 40 to clamp shaft 70.

Figure 2:
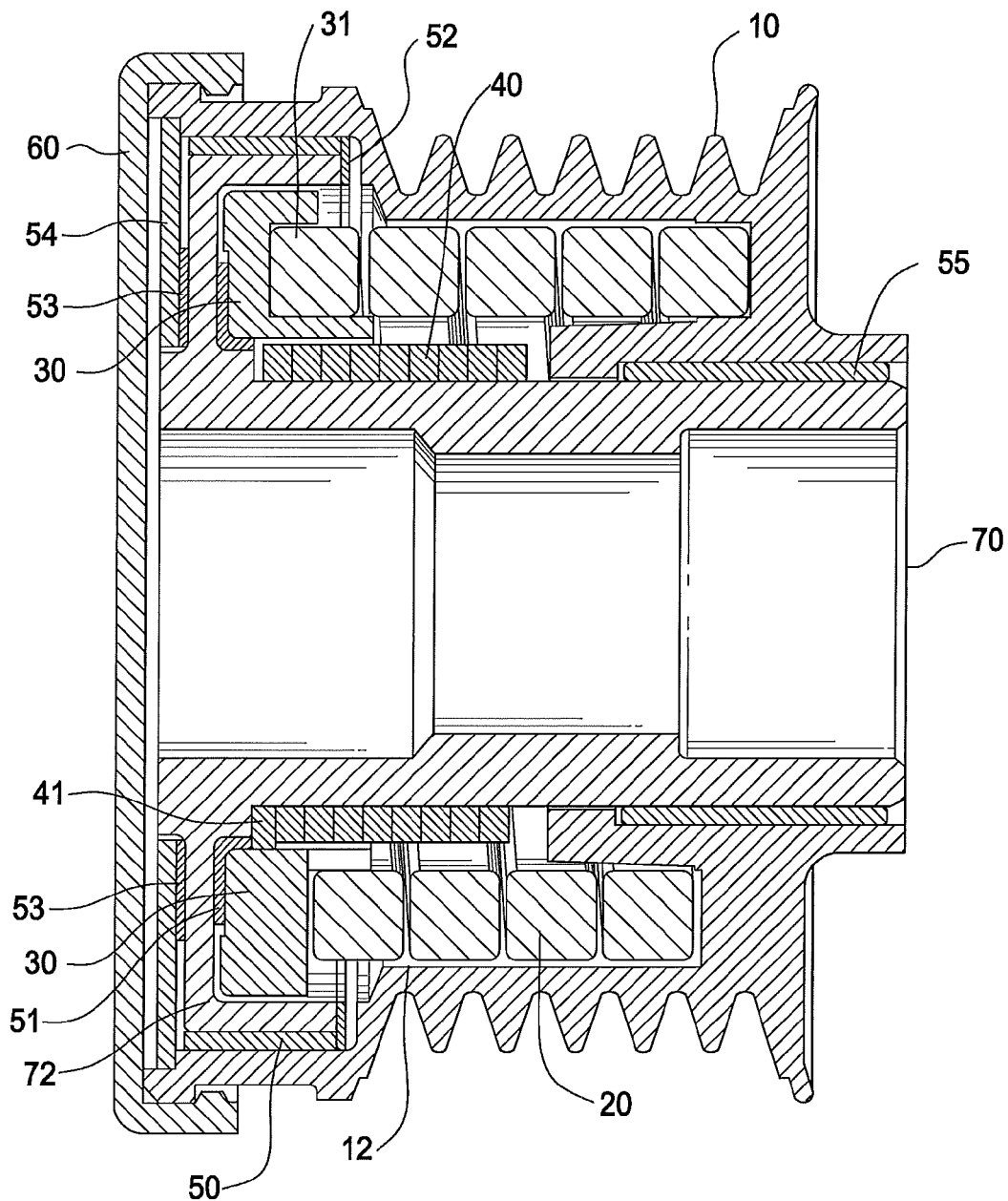
FIG. 2 is a cross-sectional view of the device.

FIG. 2 is a cross-sectional view of the device. Thrust washer 54 is press fit into an end of pulley 10. Spring carrier 30 is rotationally moveable on bushing 51 relative to shaft 70.

It is known that the rated peak torque of an alternator is less than the peak torque observed when starting the engine. For example, a typical automotive alternator will have a rated peak torque of 12 Nm, an inertia of 0.0030 kg m², and an acceleration rate at the alternator of 8,400 rad/s² during engine starting. Using Equation 1 at engine start-up the device must be able to handle 25.2 Nm of torque, but will not see such a high torque during all other operating conditions.

$$T=I\alpha \qquad \text{Equation 1:}$$

T=torque
I=alternator inertia
α=acceleration rate $$T=(0.0030)*8400=25.2 \text{ Nm}$$

To optimize the isolating torsion spring 20 it is beneficial to have an overload feature that prevents excessive torque such as that which can be realized during start up, transmitted from the pulley 10 to the isolating torsion spring 20. Excessive torque applied to the isolating torsion spring 20 could over-stress the isolating torsion spring 20 causing premature failure. The inventive device is configured in such a way that when the pulley 10 attempts to transmit torque that exceeds a predetermined level, an overload feature is enabled.

Wrap spring one way clutches are known. They operate by tension in the wrap spring causing the wrap spring to tighten around a shaft in the winding direction. The tension creates a normal force between the wrap spring and shaft. The normal force generates friction between the wrap spring and shaft which enables the transmission of torque to the shaft. Releasing the tension in the wrap spring reduces or removes the normal force thereby diminishing or releasing the wrap spring as a clutch function.

Pulley 10 in the inventive device comprises has an engaging surface 11 for engaging an end 42 of the wrap spring one-way clutch 40. Pulley 10 engages the wrap spring one way clutch by contacting the end 42, and in doing so wrap spring one-way clutch 40 is unwound from the shaft 10. The result of this unwinding is the elimination of tension in the wrap spring one way clutch 40 which results in the release of the wrap spring one-way clutch from the shaft surface 71.

Figure 3:
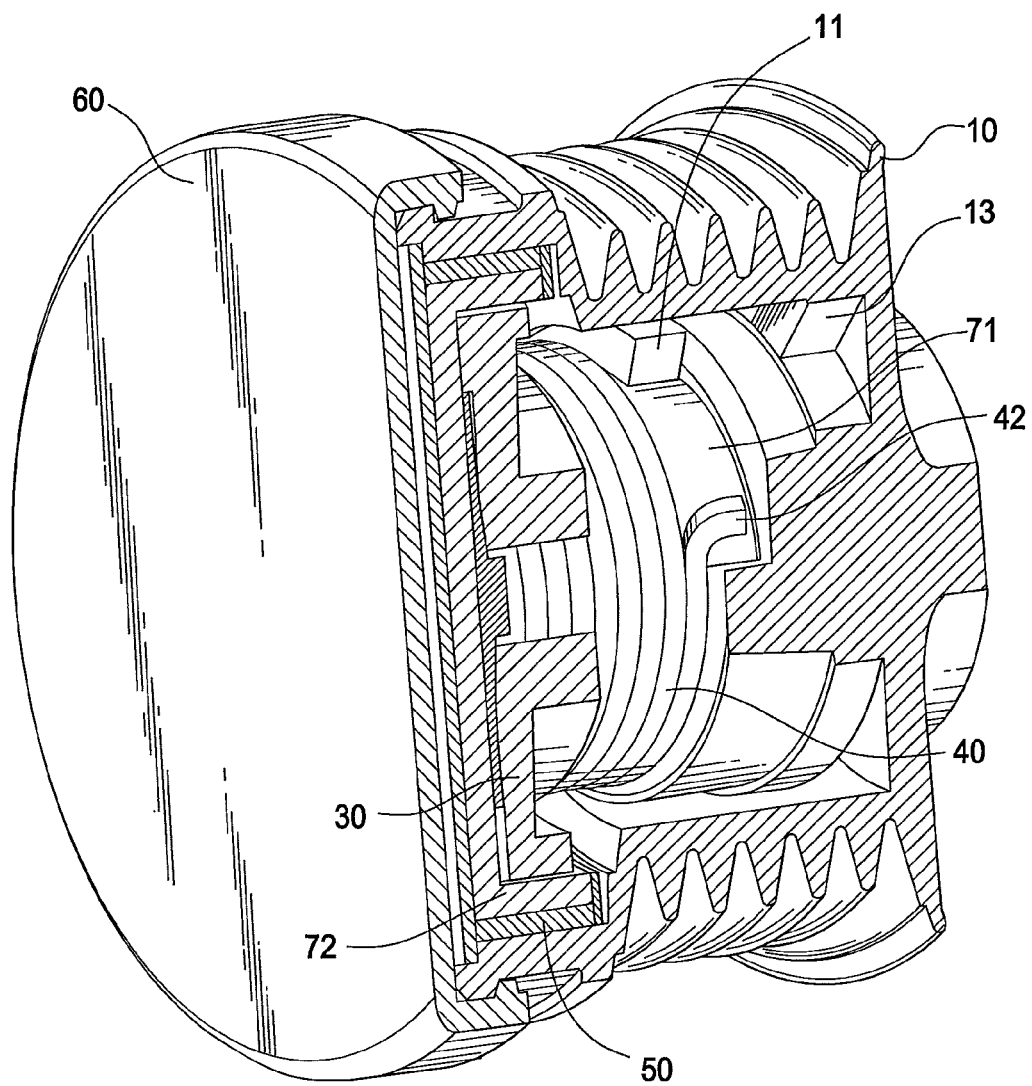
FIG. 3 is a perspective cut away view of the device.

The described overload feature releases the wrap spring one-way clutch 40 allowing it to slip on surface 71 which effectively removes the alternator inertia from Equation 1 and thus reduces the torque transmitted, in turn eliminating exposure of the torsion spring 20 to excessive torque. The wrap spring 40 to engaging surface 71 disengagement occurs when, at a predetermined torque, the deflection of the isolating torsion spring 20 allows the pulley 10 to rotate a sufficient amount to cause the engaging surface face 11 to engage end 42, see FIG. 3. FIG. 3 is a perspective cut away view of the device. Pulley 10 is temporarily engagable with the wrap spring one way clutch end 42 in an wrap spring unwinding direction whereby the temporary contact with the pulley 10 partially or totally releases the frictional engagement of the wrap spring one way clutch 40 from the shaft surface 71, which in turn allows the shaft to slip and thereby to rotate relative to the wrap spring one way clutch.

The isolating torsion spring 20 is installed such that is it loaded in the unwinding direction. End 21 of spring 20 engages surface 13 of pulley 10. Torsion spring 20 is arranged such that it has an interference fit on the inside diameter with each of its two mating parts; the pulley 10 inner surface 12 and spring carrier 30 inner surface 31. This interference maintains the rotational position of these components during conditions where the shaft 70 over runs pulley 10 such as during vehicle transmission shifts. During normal loading the isolating torsion spring 20 ends transmit torsion forces from the pulley to the spring carrier. Maintaining contact between the torsion spring 20 and pulley 10 and spring carrier 30 is desirable to prevent separation of these components and therefore eliminate the associated potential noise generation when normal function resumes bringing these components together again after an overrun condition occurs. The interference fit causes the isolating torsion spring 20 to act somewhat like a wrap spring during overrun conditions which maintains the proper component contact.

Figure 4:
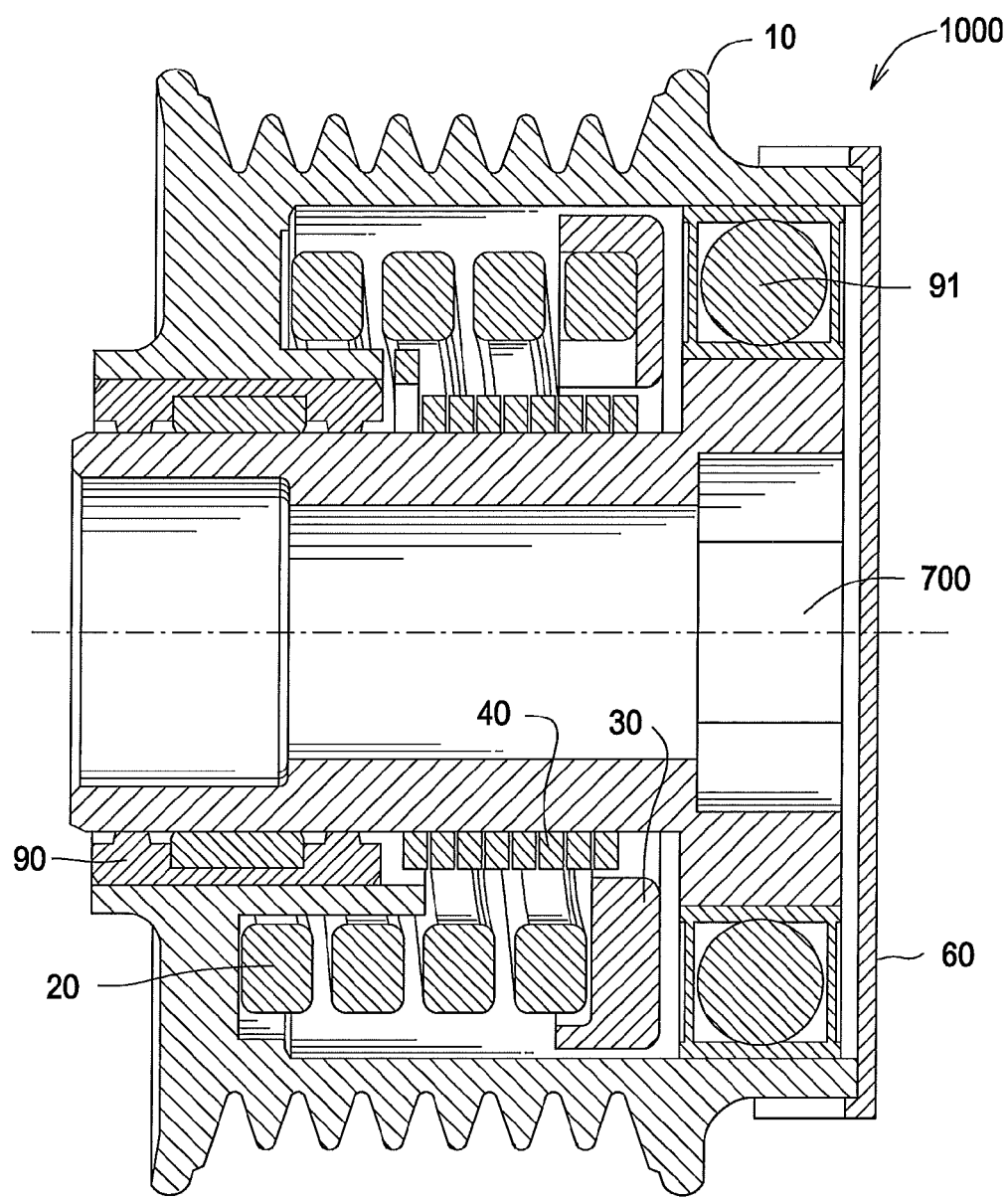
FIG. 4 is a cross-sectional view of an alternate embodiment.

FIG. 4 is a cross-sectional view of an alternate embodiment. In this alternate embodiment the bushings 50, 55 are replaced with bearings 90, 91. Flange 72 is absent since the bearings 90, 91 serve to locate the pulley with respect to the shaft 700, thereby eliminating the thrust washer 54. Bearing 90 comprises a needle bearing and bearing 91 comprises a ball bearing.

Figure 5:
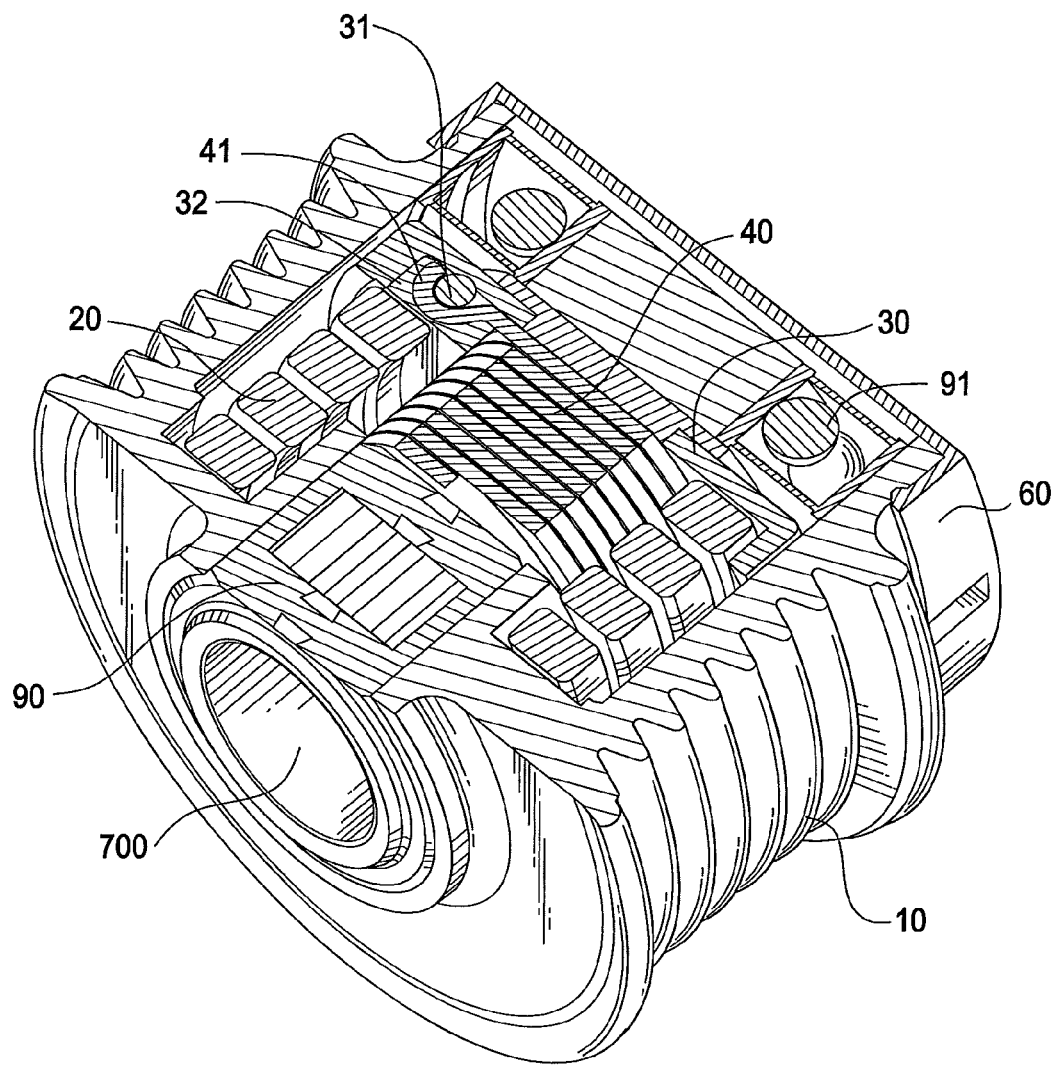
FIG. 5 is a perspective cut away view of the alternate embodiment.

FIG. 5 is a perspective cut away view of the alternate embodiment. End 41 of wrap spring 40 is retained in the spring carrier 30 by a dowel 31. End 41 has a hook-like shape to engage the dowel 31. Spring carrier 30 has a slot 32 to receive end 41.

Although forms of the invention have been described herein, it will be obvious to those skilled in the art that variations may be made in the construction and relation of parts without departing from the spirit and scope of the invention described herein.

We claim:

1. An isolator decoupler comprising:
   a pulley;
   a shaft;
   the pulley journalled to the shaft on a low friction bushing;
   a spring carrier disposed within the pulley;
   a torsion spring coupled between the pulley and the spring carrier;
   a wrap spring one way clutch wrapped about the shaft and having a frictional engagement therewith, the wrap spring one way clutch coupled to the spring carrier;
   the wrap spring one way clutch is disposed radially inward of the torsion spring; and
   the pulley temporarily engagable with an end of the wrap spring one way clutch in an unwinding direction whereby a temporary contact between the wrap spring one way clutch end and the pulley will temporarily diminish the frictional engagement of the wrap spring one way clutch with the shaft.

2. The isolator decoupler as in claim 1 comprising a thrust washer between the pulley and the shaft.

3. The isolator decoupler as in claim 1, wherein the torsion spring is loaded in the unwinding direction.

4. An isolator decoupler comprising:
   a pulley;
   a shaft;
   the pulley journalled to the shaft;
   a spring carrier disposed within the pulley;
   a torsion spring coupled between the pulley and the spring carrier;
   a wrap spring one way clutch wrapped about the shaft and having a frictional engagement, the wrap spring one way clutch coupled to the spring carrier;
   the wrap spring one way clutch is disposed radially inward of the torsion spring; and
   the pulley temporarily engagable with an end of the wrap spring one way clutch in an unwinding direction whereby a temporary contact between the wrap spring one way clutch end and the pulley can temporarily release the frictional engagement of the wrap spring one way clutch from the shaft.

5. The isolator decoupler as in claim 4, wherein the torsion spring is loaded in the unwinding direction.

6. An isolator decoupler comprising:

a pulley;

a shaft;

the pulley journalled to the shaft;

a spring carrier disposed within the pulley;

a torsion spring coupled between the pulley and the spring carrier;

a wrap spring one way clutch wrapped about the shaft and having a frictional engagement therewith, the wrap spring one way clutch coupled to the spring carrier;

the wrap spring one way clutch is disposed radially inward of the torsion spring; and the pulley temporarily engagable with an end of the wrap spring one way clutch whereby a contact with the end in an unwinding direction temporarily reduces the frictional engagement of the wrap spring one way clutch with the shaft.

7. The isolator decoupler as in claim 6, wherein the torsion spring is loaded in the unwinding direction.

* * * * *